(12) United States Patent
Ho et al.

(10) Patent No.: US 11,185,767 B2
(45) Date of Patent: Nov. 30, 2021

(54) GAMING DEVICE AND GAMING CONTROLLER

(71) Applicants: Ming-Hsuan Ho, Taipei (TW); Chuang-Yuan Cheng, Taipei (TW); Che-An Wu, Taipei (TW); Yu-Chiang Lo, Taipei (TW); Chen-Cheng Wang, Taipei (TW); Chun-Chieh Chen, Taipei (TW); Ming-Hsien Wu, Taipei (TW); Chen-Yi Huang, Taipei (TW)

(72) Inventors: Ming-Hsuan Ho, Taipei (TW); Chuang-Yuan Cheng, Taipei (TW); Che-An Wu, Taipei (TW); Yu-Chiang Lo, Taipei (TW); Chen-Cheng Wang, Taipei (TW); Chun-Chieh Chen, Taipei (TW); Ming-Hsien Wu, Taipei (TW); Chen-Yi Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/842,769

(22) Filed: Apr. 8, 2020

(65) Prior Publication Data

US 2020/0324198 A1 Oct. 15, 2020

Related U.S. Application Data

(60) Provisional application No. 62/831,692, filed on Apr. 9, 2019.

(51) Int. Cl.
*A63F 13/245* (2014.01)
*A63F 13/92* (2014.01)
(Continued)

(52) U.S. Cl.
CPC .......... *A63F 13/245* (2014.09); *A63F 13/213* (2014.09); *A63F 13/24* (2014.09);
(Continued)

(58) Field of Classification Search
CPC ........ A63F 13/24; A63F 13/245; A63F 13/92; A63F 13/98; A63F 13/803; A63F 13/428; A63F 13/211; A63F 2300/1062
See application file for complete search history.

(56) References Cited

U.S. PATENT DOCUMENTS

D602,096 S * 10/2009 Ashida ............... G01R 33/0035
D14/414
D795,963 S * 8/2017 Sakai ........................... D21/333
(Continued)

FOREIGN PATENT DOCUMENTS

| CN | 206355571 | 7/2017 |
| CN | 208418113 | 1/2019 |

OTHER PUBLICATIONS

"Office Action of Taiwan Counterpart Application", dated Jan. 5, 2021, p. 1-p. 14.

*Primary Examiner* — Chase E Leichliter
(74) *Attorney, Agent, or Firm* — JCIPRNET (57) ABSTRACT

A gaming device including a self-stabilizing module with at least two self-stabilizing axes, a display assembled to the self-stabilizing module, a controller assembly assembled to the self-stabilizing module, a motion sensor, and a processing module is provided. A relative movement of the controller assembly and the display are generated via at least one self-stabilizing axis of the self-stabilizing module. The processing module generates a frame signal to transfer to the display according to a program. When the self-stabilizing module is activated and the relative movement is generated, the motion sensor generates a control signal to the processing module, and the processing module generate another frame signal, which correspondingly depicts a posture of the controller assembly relative to the display, to transfer to the (Continued)

display according to the control signal and the program. A gaming controller is also provided.

25 Claims, 5 Drawing Sheets

(51) Int. Cl.
  *A63F 13/98* (2014.01)
  *A63F 13/803* (2014.01)
  *A63F 13/213* (2014.01)
  *A63F 13/24* (2014.01)
  *A63F 13/26* (2014.01)

(52) U.S. Cl.
  CPC ............ *A63F 13/26* (2014.09); *A63F 13/803* (2014.09); *A63F 13/92* (2014.09); *A63F 13/98* (2014.09)

(56) References Cited

U.S. PATENT DOCUMENTS

| | | | |
|---|---|---|---|
| 10,220,309 B2* | 3/2019 | Kamata | A63F 13/2145 |
| D849,843 S * | 5/2019 | Lambert | D21/333 |
| 10,888,770 B2* | 1/2021 | Onozawa | A63F 13/98 |
| 2007/0077541 A1* | 4/2007 | Champagne | A63F 13/42 |
| | | | 434/62 |
| 2008/0319252 A1* | 12/2008 | Chapman | A63F 13/2145 |
| | | | 600/27 |
| 2009/0052037 A1* | 2/2009 | Wernersson | H04N 5/2253 |
| | | | 359/554 |
| 2009/0093307 A1* | 4/2009 | Miyaki | A63F 13/24 |
| | | | 463/37 |
| 2011/0053691 A1* | 3/2011 | Bryant | A63F 13/245 |
| | | | 463/37 |
| 2012/0040758 A1* | 2/2012 | Hovseth | A63F 13/98 |
| | | | 463/37 |
| 2012/0091313 A1* | 4/2012 | Cohn | H04M 1/04 |
| | | | 248/682 |
| 2012/0122578 A1* | 5/2012 | Song | A63F 13/211 |
| | | | 463/36 |
| 2013/0294016 A1* | 11/2013 | Wilson | A63F 13/235 |
| | | | 361/679.01 |
| 2014/0051517 A1* | 2/2014 | Russo | A63F 13/245 |
| | | | 463/37 |
| 2014/0051518 A1* | 2/2014 | Russo | G01R 33/0035 |
| | | | 463/37 |
| 2014/0256436 A1* | 9/2014 | Grever | A63F 13/245 |
| | | | 463/36 |
| 2015/0031510 A1* | 1/2015 | Ben-Haim | A63B 21/00181 |
| | | | 482/110 |
| 2015/0308618 A1* | 10/2015 | Valero | F16M 11/2071 |
| | | | 700/213 |
| 2018/0264321 A1* | 9/2018 | Nir | A63F 13/22 |
| 2019/0176029 A1* | 6/2019 | Kamata | A63F 13/98 |
| 2020/0269130 A1* | 8/2020 | Provancher | G06F 3/016 |
| 2020/0324197 A1* | 10/2020 | Ho | A63F 13/213 |

* cited by examiner

GAMING DEVICE AND GAMING CONTROLLER

CROSS-REFERENCE TO RELATED APPLICATION

This application claims the priority benefit of U.S. provisional application Ser. No. 62/831,692, filed on Apr. 9, 2019. The entirety of the above-mentioned patent application is hereby incorporated by reference herein and made a part of this specification.

BACKGROUND

Technical Field

The present invention relates to a gaming device and a gaming controller.

Description of Related Art

As the market for video games and mobile devices continues to expand, there are many mobile games for mobile devices on the market. However, games developed on existing mobile devices still need to be controlled by using buttons or touch screens equipped on the mobile devices. Therefore, it is very inconvenient for users, and user's physical experience of the game is easily degraded due to poor controllability.

Accordingly, how to provide a gaming device or a gaming controller that is sufficient to reflect the state of a game on the existing mobile device is a problem that people skilled in the art need to think about and solve.

SUMMARY

The present invention provides a gaming device and a gaming controller, which can provide a better experience for game operations of mobile games.

An exemplary embodiment provides a gaming device, which includes a self-stabilizing module, a display, a controller assembly, a motion sensor, and a processing module. The self-stabilizing module has at least two self-stabilizing axes. The display is assembled to the self-stabilizing module, and the controller assembly is assembled to the self-stabilizing module. A relative movement between the controller assembly and the display is generated through at least one of the self-stabilizing axes. The processing module generates a frame signal to transfer to the display according to a program. When the self-stabilizing module is activated and generates the relative movement, the motion sensor generates a control signal, and the processing module generates another frame signal to transfer to the display according to the control signal and the program, and the another frame signal correspondingly depicts a movement posture of the controller assembly relative to the display.

The present invention provides a gaming controller configured to control an external electronic device. The gaming controller includes a self-stabilizing module, a motion sensor and a controller assembly. The self-stabilizing module has at least two self-stabilizing axes, and the external electronic device is suitable for assembling in the self-stabilizing module. The controller assembly is assembled to the self-stabilizing module, so that the controller assembly and the external electronic device generate a relative movement through at least one of the self-stabilizing axes, and the external electronic device is not on a movement track of the controller assembly, and the motion sensor generates a control signal to transfer to the external electronic device in response to the relative movement.

In an exemplary embodiment, the self-stabilizing module includes a sequence formed by a plurality of structural members and a plurality of self-stabilizing units. Two structural members are connected by one of the self-stabilizing units. The controller assembly includes a steering wheel, and the steering wheel and the display are disposed respectively at the first structure member and the last structure member of the sequence.

In an exemplary embodiment, each of the self-stabilizing units has a self-stabilizing axis, and the self-stabilizing axes are orthogonal to each other.

In an exemplary embodiment, the structural member disposed with the display is an adjustable fixture.

In an exemplary embodiment, the structural member has an electrical connection interface, and the display is electrically connected to the self-stabilizing module through the electrical connection interface.

In an exemplary embodiment, the controller assembly further includes at least one controller disposed on the steering wheel and electrically connected or wirelessly connected to the processing module.

In an exemplary embodiment, when the relative movement is generated, the display is not on the movement track of the controller assembly.

In an exemplary embodiment, the normal line of the display is parallel to one of the stabilization axes.

In an exemplary embodiment, the normal lien of the display is coaxial with one of the stabilization axes.

In an exemplary embodiment, the processing module and the self-stabilizing module are located in the same object.

In an exemplary embodiment, the processing module and the display are located in the same object.

In an exemplary embodiment, the motion sensor is an optical tracking sensor, which is disposed on the self-stabilizing module to sense the relative rotation angle between different structural members of the self-stabilizing module.

In an exemplary embodiment, the motion sensor is a gyroscope, which is disposed on the self-stabilizing module to sense the relative rotation angle between different structural members of the self-stabilizing module.

In an exemplary embodiment, the external electronic device is a display, and the gaming controller includes a processing module, and the display is assembled to or removable from the self-stabilizing module. The display assembled to the self-stabilizing module is electrically connected to the self-stabilizing module, the controller assembly and the processing module. The processing module generates a frame signal to transfer to the display according to a program, and the processing module generates another frame signal to transfer to the display according to the control signal and the program. This another frame signal correspondingly depicts a movement posture of the controller assembly relative to the display.

In an exemplary embodiment, the external electronic device includes a display and a processing module. When the external electronic device is assembled to the self-stabilizing module, the display, the processing module, the self-stabilizing module and the controller assembly are electrically connected. The processing module generates a frame signal to transfer to the display according to the program, and the processing module generates another frame signal to transfer to the display according to the control signal and the program. This another frame signal correspondingly depicts a movement posture of the controller assembly relative to the display.

In an exemplary embodiment, the controller assembly further includes at least one control button or at least one control paddle, which is disposed on the steering wheel.

In an exemplary embodiment, the display is assembled on a first connection part of the self-stabilizing module, and the controller assembly is assembled on a second connection part of the self-stabilizing module. The second connection part is different from the first connection part. The first connection portion and the second connection portion generate a relative movement through the at least two self-stabilizing axes.

In an exemplary embodiment, the external electronic device is assembled on the first connection part of the self-stabilizing module, and the controller assembly is assembled on the second connection part of the self-stabilizing module. The second connection part is different from the first connection part. The first connection portion and the second connection portion generate a relative movement through the at least two self-stabilizing axes.

Based on the above, in the gaming device and gaming controller of the exemplary embodiments, by the interaction between the self-stabilizing module, the controller assembly, the motion sensor and the processing module, after the self-stabilizing module is activated, a relative movement between the controller assembly and the display may be generated by at least one self-stabilizing axis of the self-stabilizing module, and the motion sensor may sense the relative movement to generate a control signal, so that the processing module can receive the control signal and generates accordingly a frame signal to transfer to the display. Accordingly, through a real-time operation of the controller assembly and a real-time response to the display, the presence of the user may be increased when operating the gaming device.

DESCRIPTION OF THE EMBODIMENTS

Figure 1:
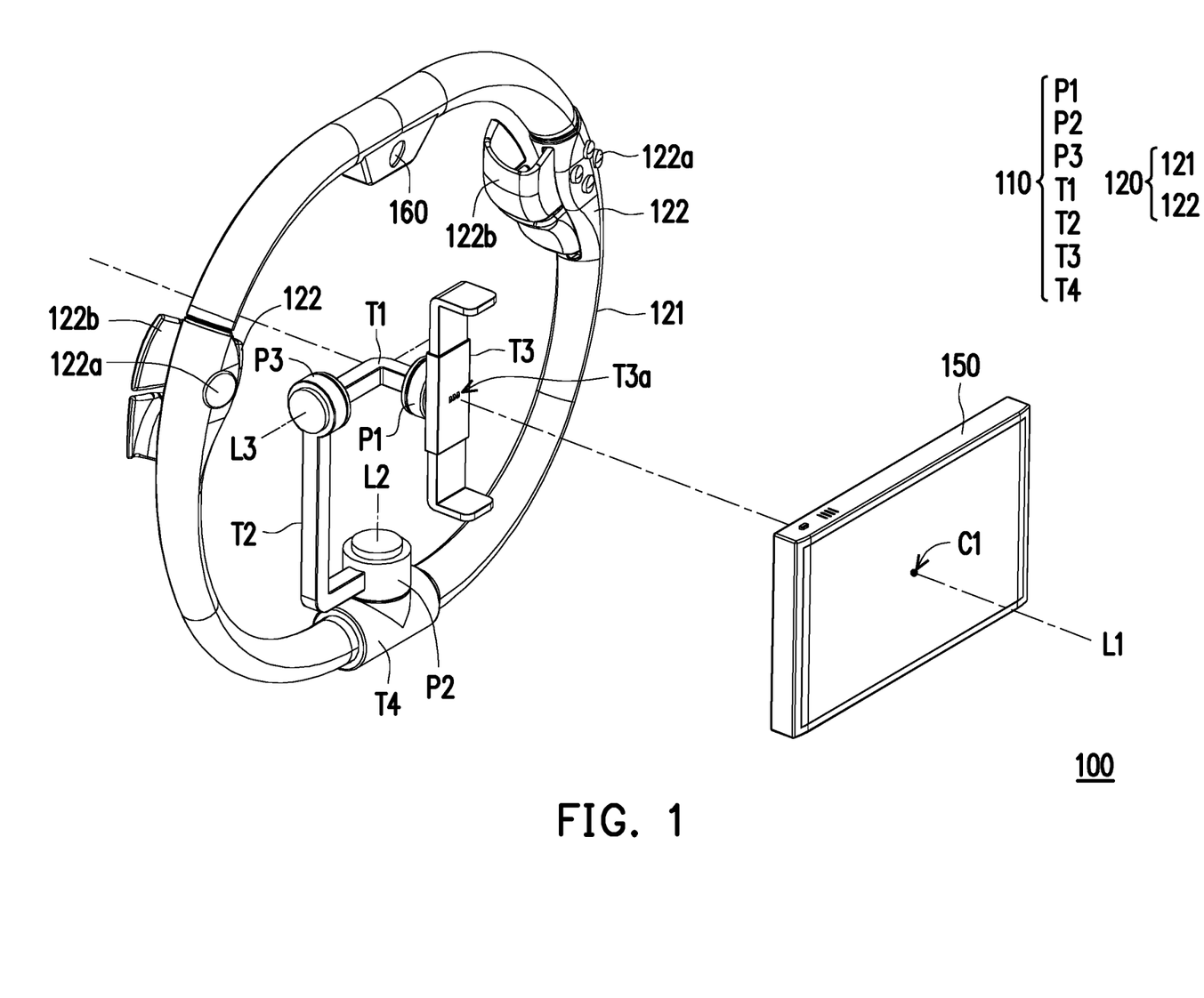
FIG. 1 is an assembly diagram of a gaming device according to an exemplary embodiment of the present invention.
Figure 2:
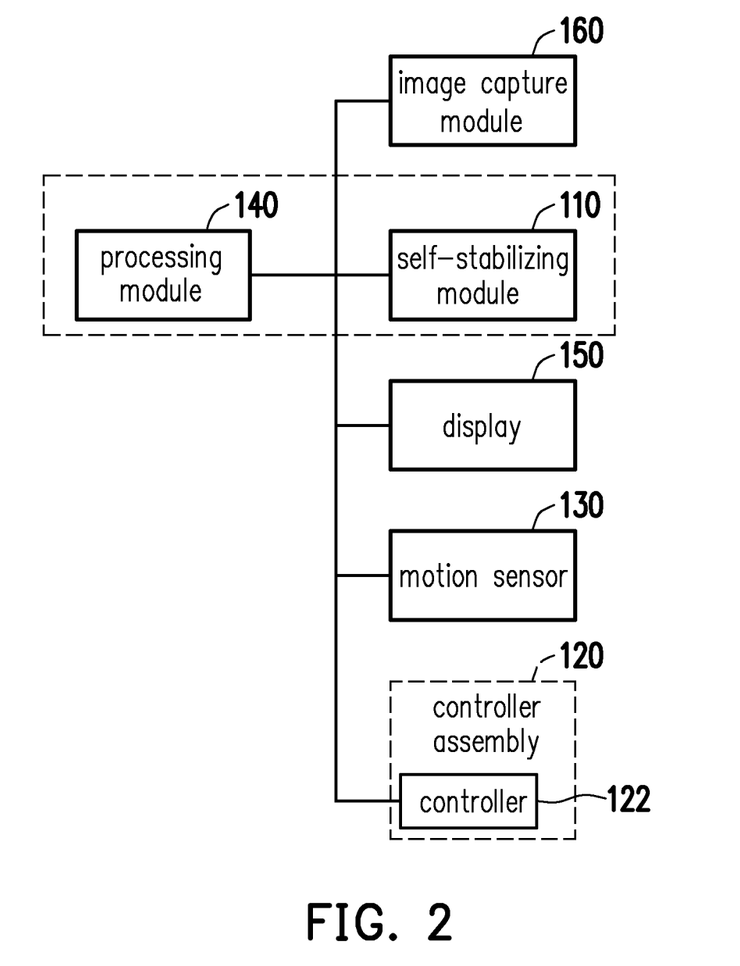
FIG. 2 is a block diagram of the gaming device of FIG. 1.

FIG. 1 is an assembly diagram of a gaming device according to an exemplary embodiment of the present invention. FIG. 2 is a block diagram of the gaming device of FIG. 1. Referring to FIG. 1 and FIG. 2, in the present exemplary embodiment, the gaming device 100 includes a self-stabilizing module 110, a display 150, a controller assembly 120, a motion sensor 130, and a processing module 140. The self-stabilizing module 110 has at least two self-stabilizing axes. Herein, a plurality of self-stabilizing axes L1 to L3 are taken as an example. The display 150 is assembled on the first connection part of the self-stabilizing module 110, the controller assembly 120 is assembled on the second connection part of the self-stabilizing module 110, and the second connection part is different from the first connection part. The first connection part and the second connection part generate a relative movement through the at least two self-stabilizing axes. That is, the relative movement between the controller assembly 120 and the display 150 shown in the present exemplary embodiment is generated through at least one of the self-stabilizing axes L1 to L3. The processing module 140 generates the frame signal to transfer to the display 150 according to the program. When the self-stabilizing module 110 is activated and generates the relative movement, the motion sensor 130 generates a control signal, the processing module 140 generates another frame signal to transfer to the display 150 according to the control signal and the program, and this another frame signal correspondingly depicts a movement posture of the controller assembly 120 relative to the display 150. In addition, the gaming device 100 also includes an image capture module 160 electrically connected to the processing module 140 and configured to capture a user image for the control signals and the program. It should be noted that the use of the image signal captured by the image capture module 160 is not be limited in the exemplary embodiment.

Herein, the motion sensor 130 is, for example, an optical tracking sensor, which is disposed on the self-stabilizing module 110 to sense the relative rotation angle between different structural members T1 to T4 of the self-stabilizing module 110. In another exemplary embodiment, the motion sensor 130 may also be a gyroscope, which is disposed on the self-stabilizing module 110 to sense the relative rotation angle between different structural members T1 to T4 of the self-stabilizing module 110. In the present exemplary embodiment, the structural member T3 can be considered as the first connection portion, and the structural member T4 can be considered as the second connection portion.

As shown in FIG. 1, the self-stabilizing module 110 includes a sequence formed by the plurality of structural members T1 to T4 and a plurality of self-stabilizing units P1 to P3. Two adjacent structural members (of T1~T4) are connected by one of the self-stabilizing units P1 to P3. In the present exemplary embodiment, the controller assembly 120 includes a steering wheel 121 and a controller 122 disposed on the steering wheel 121, wherein the steering wheel 121 and the display 150 are respectively disposed at the first structure member and the last structure member of the sequence. That is, the sequence generated by the self-stabilizing module 110 of the present exemplary embodiment is the structural member T3, the self-stabilizing unit P1, the structural member T1, the self-stabilizing unit P3, the structural member T2, the self-stabilizing unit P2 and the structural member T4, and the display 150 is assembled on the structural member T3, and the steering wheel 121 is assembled on the structural member T4.

Furthermore, the self-stabilizing units P1 to P3 respectively have corresponding self-stabilizing axes L1 to L3, and the self-stabilizing axes L1 to L3 are orthogonal to each other and used for as reference axes constituting a movement space. Additionally, the structural member T3 equipped with the display 150 is an adjustable fixture, which has a telescopic arm. The telescopic arm may be adjusted according to the different sizes of the display 150. Moreover, the adjustable fixture (the structure member T3) includes an electrical connection interface T3a, and the display 150 may be electrically connected to the self-stabilizing module 110 through the electrical connection interface T3a. After assembling, the normal line of the display 150 is parallel to one of the self-stabilizing axes, and in the present exemplary embodiment, the normal lien of the display 150 is coaxial with one of the self-stabilizing axes. Herein, the self-stabilizing axis L1 is shown to run through the center C1 of the display 150 and the self-stabilizing unit P1 as an example.

Here, the controller 122 includes a control button 122a or a control paddle 122b, which is disposed on the steering wheel 121 to facilitate the operations by the user, and the controller 122 is electrically or wirelessly connected to the processing module 140 to feedback operations generated by the user to the processing module 140 in real time, and further show the operations on the display 150.

Figure 4A:
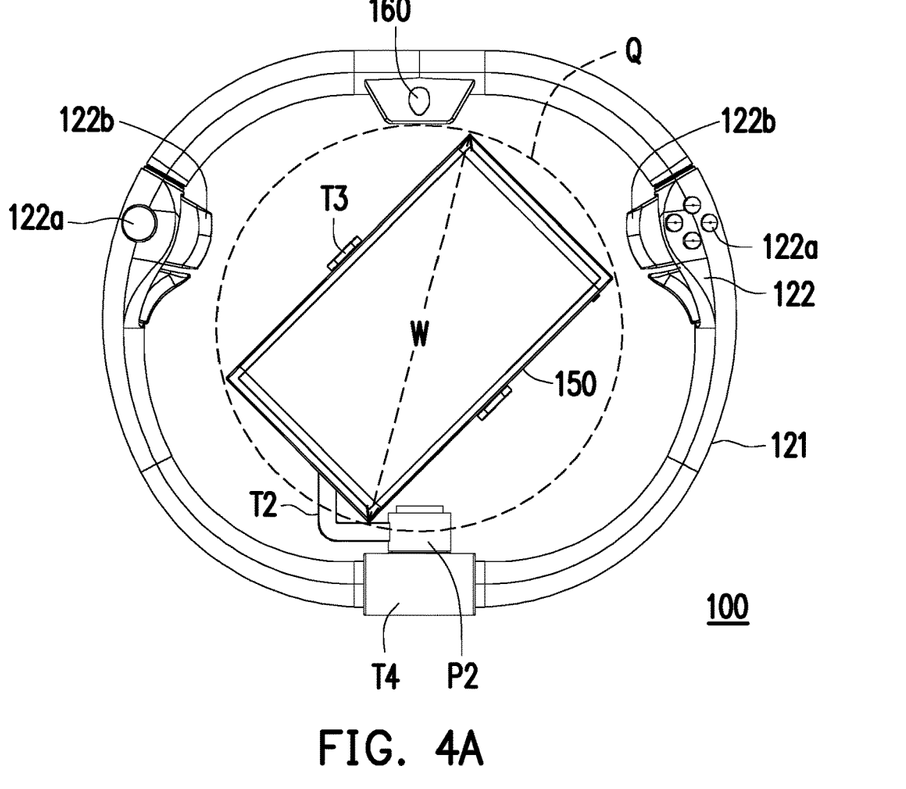
FIG. 4A to FIG. 4C are schematic diagrams respectively illustrating the relative movement between the controller assembly and the display through the self-stabilizing module.
Figure 4B:
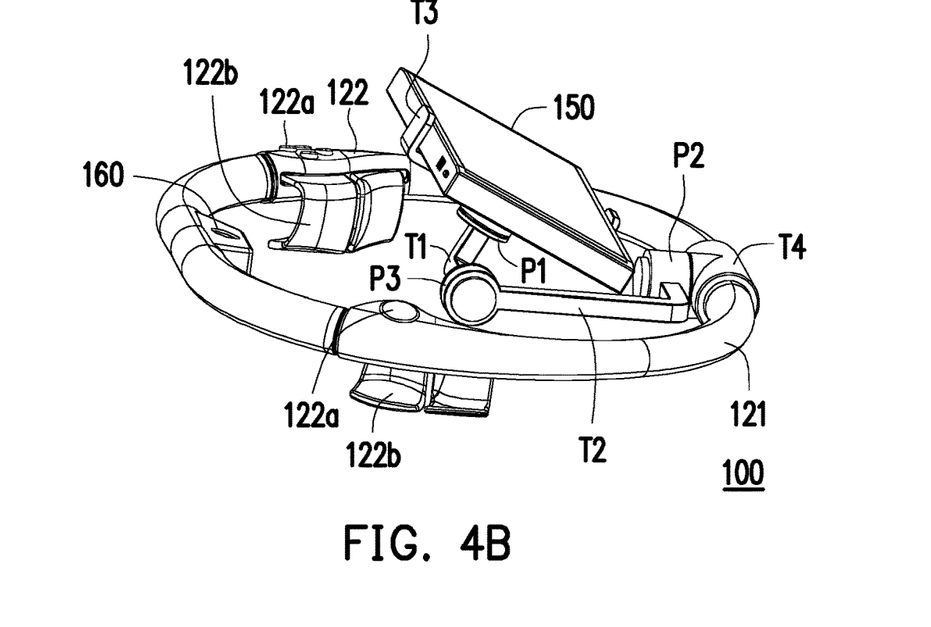
Figure 4C:
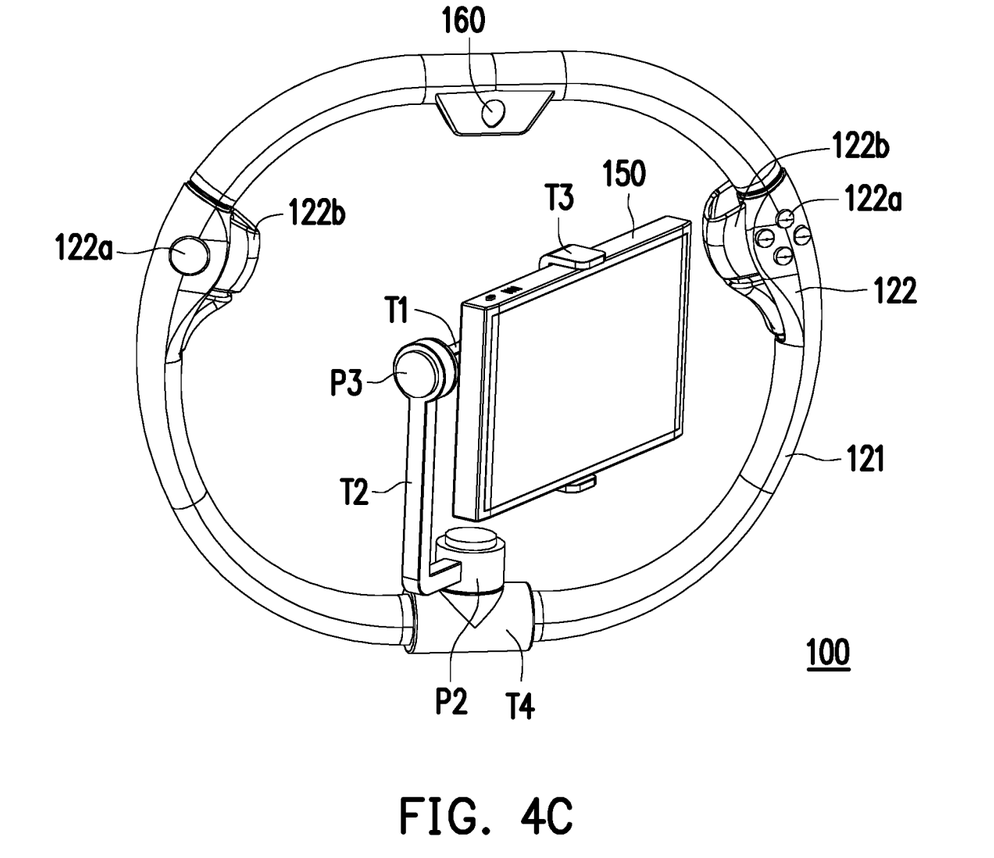

FIG. 4A to FIG. 4C are schematic diagrams respectively illustrating the relative movement between the controller assembly and the display through the self-stabilizing module. Referring to FIG. 4A to FIG. 4C, based on the configuration and the electrical connection relationship shown in FIG. 1 and FIG. 2, a user may operate the steering wheel 121 and the controller 122 of the controller assembly 120 to reflect the user's actions on the display 150 in real time. For example, referring to FIG. 4A with FIG. 1, FIG. 4A illustrates that the controller assembly 120 and the display 150 generate a relative rotational movement on the self-stabilizing axis L1 through the self-stabilizing unit P1. Next, referring to FIG. 4B with FIG. 1. FIG. 4B illustrates that the controller assembly 120 and the display 150 generate a relative rotational movement with the self-stabilizing axis L3 through the self-stabilizing unit P3. Next, referring to FIG. 4C with FIG. 1, FIG. 4C illustrates that the controller assembly 120 and the display 150 generate a relative rotational movement on the self-stabilizing axis L2 through the self-stabilizing unit P2. Based on the above, it may be clearly known that when the relative movement occurs, the display 150 and the controller assembly 120 respectively have movement ranges without interfering with each other. That is, the display 150 is not substantially on the movement track of the controller assembly 120. As shown in FIG. 4A, the display 150 has a spherical space range Q formed by its contour diagonal W, and the controller assembly 120 is substantially outside the spherical space range Q such that the user can operate the controller assembly 120 without colliding with display 150.

In addition, referring to the dotted line shown in FIG. 2, which represents that the processing module 140 and the self-stabilizing module 110 are disposed on the same object. In addition to the electrical connection interface T3a, the display 150 may also be electrically connected to the self-stabilizing module 110 and the processing module 140 disposed thereon by wireless communication means.

Figure 3:
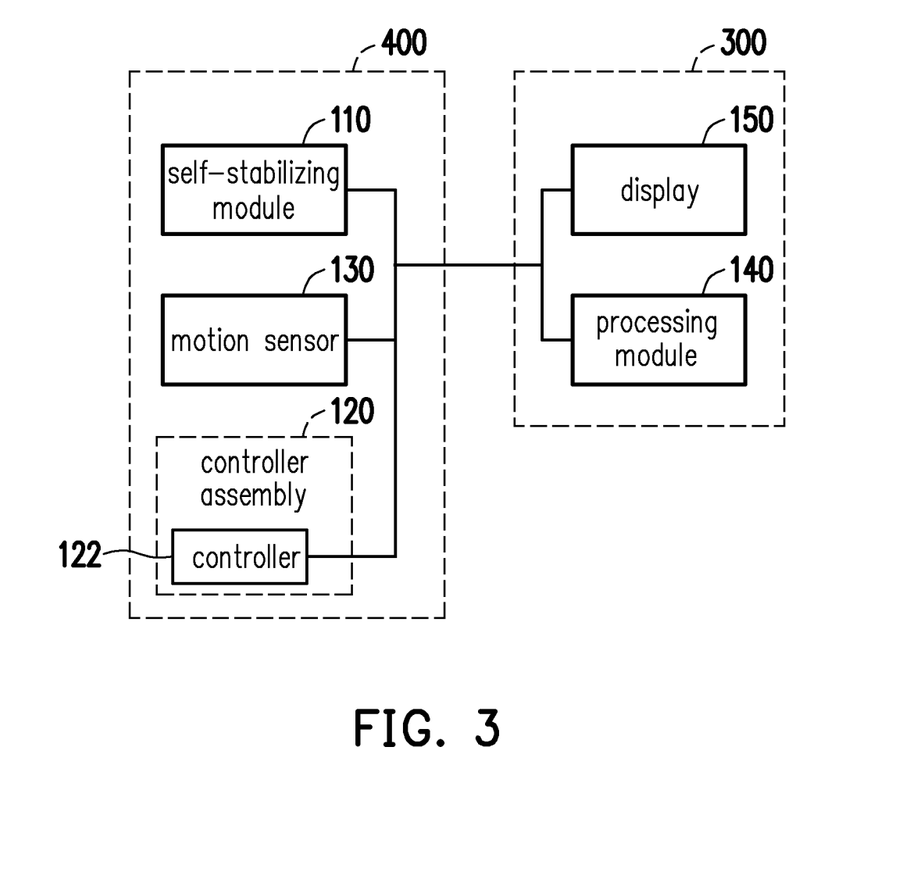
FIG. 3 is a block diagram of a correspondence relationship between a gaming controller and an external electronic device according to another embodiment of the present invention.

FIG. 3 is a block diagram of a correspondence relationship between a gaming controller and an external electronic device according to another embodiment of the present invention. Referring to FIG. 3, this exemplary embodiment discloses a gaming controller 400 for performing a game control on an external electronic device 300. The gaming controller 400 includes the self-stabilizing module 110, the motion sensor 130, and the controller assembly 120. The external electronic device 300 includes the display 150 and the processing module 140. In other words, the processing module 140 of this exemplary embodiment is located on the same object with the display 150. In addition, the external electronic device 300 and the gaming controller 400 may be wired and electrically connected, such as by the electrical connection interface T3a, and may also be connected by using the aforementioned wireless communication means, which is not limited here. Herein, the external electronic device 300 may be a variety of mobile electronic devices. The user may use the controller assembly 120 of the gaming controller 400 to control the external electronic device 300. That is, the external electronic device 300 may generate a picture corresponding the movement posture on the display 150 according to the movement posture and the program of the controller assembly 120.

In summary, in the above embodiments of the present invention, the gaming device or gaming controller, by the interaction between the self-stabilizing module, the controller assembly, the motion sensor and the processing module, after the self-stabilizing module is activated, a relative movement between the controller assembly and the display can be sensed by the motion sensor to generate a control signal, so that the processing module can receive the control signal and generates accordingly a frame signal to transfer to the display. Therefore, the frame signal can reflect the operating posture of the controller assembly relative to the display in real time.

In particular, the controller assembly of the present invention includes the steering wheel and the controller disposed thereon, and the display is not on the movement track of the controller assembly, so an interference or a collision between the controller assembly and the display due to the relative movement may be effectively prevented.

Furthermore, on the case of using the self-stabilizing module as a necessary component of the controller assembly to provide real-time control for a user, a designer can correspondingly design a gaming device or a gaming controller according to the needs. The designer can provide complete game consoles, programs and accessories, while the gaming device and the gaming controller are considered as game accessories that can be used with existing mobile devices. Both of them can provide users with a real-time game experience. That is, by the real-time operation of the controller assembly and the real-time response to the display, users can feel the presence when playing the game.

What is claimed is:
1. A gaming device comprising:
 a self-stabilizing module, including a sequence formed by
  a plurality of structural members and a plurality of self-stabilizing units, each of the self-stabilizing units having a self-stabilizing axis, and two structural members among the plurality of self-stabilizing units connected by one of the self-stabilizing units;
 a display, assembled to the self-stabilizing module;
 a controller assembly, assembled to the self-stabilizing module, wherein the controller assembly and the display generate a relative movement through at least one of the self-stabilizing axes, and the controller assembly and the display are respectively disposed at a first structure member and a last structure member of the sequence;
 a motion sensor; and
 a processing module electrically connected to the motion sensor and the display, wherein the processing module generates a frame signal to transfer to the display according to a program,
 wherein when the self-stabilizing module is activated and generates the relative movement, the motion sensor generates a control signal, and the processing module generates another frame signal to transfer to the display according to the control signal and the program, said another frame signal corresponds to a movement posture of the controller assembly relative to the display.
2. The gaming device according to claim 1, wherein the controller assembly includes a steering wheel disposed at the first structure member of the sequence.

3. The gaming device according to claim 2, wherein the self-stabilizing axes of the self-stabilizing units are orthogonal to each other.

4. The gaming device according to claim 2, wherein the last structural member equipped with the display is an adjustable fixture.

5. The gaming device according to claim 2, wherein the last structural member has an electrical connection interface, and the display is electrically connected to the self-stabilizing module through the electrical connection interface.

6. The gaming device according to claim 2, wherein the controller assembly further comprises:
at least one controller, disposed on the steering wheel and electrically or wirelessly connected to the processing module.

7. The gaming device according to claim 1, wherein when the relative movement is generated, the display is not on the movement track of the controller assembly.

8. The gaming device according to claim 1, wherein a normal line of the display is parallel to one of the self-stabilizing axes.

9. The gaming device according to claim 1, wherein a normal line of the display is coaxial with one of the self-stabilizing axes.

10. The gaming device according to claim 1, wherein the processing module and the self-stabilizing module are located in a same object.

11. The gaming device according to claim 1, wherein the processing module and the display are located in a same object.

12. The gaming device according to claim 1, wherein the motion sensor is an optical tracking sensor disposed in the self-stabilizing module to sense a relative rotation angle between different structural members of the self-stabilizing module.

13. The gaming device according to claim 1, wherein the motion sensor is a gyroscope, disposed in the self-stabilizing module to sense a relative rotation angle between different structural members of the self-stabilizing module.

14. The gaming device according to claim 1, wherein the display is assembled at a first connection portion of the self-stabilizing module, and the controller assembly is assembled at a second connection portion of the self-stabilizing module, the second connection portion is different from the first connecting portion, the first connecting portion and the second connecting portion generate a relative movement through the at least two self-stabilizing axes.

15. A gaming controller for controlling an external electronic device, the gaming controller comprising:
a self-stabilizing module, including a sequence formed by a plurality of structural members and a plurality of self-stabilizing units, each of the self-stabilizing units having a self-stabilizing axis, and two structural members among the plurality of self-stabilizing units are connected by one of the self-stabilizing units, and the external electronic device is configured to be assembled to the self-stabilizing module;
a motion sensor; and
a controller assembly, assembled to the self-stabilizing module, wherein the controller assembly and the external electronic device are respectively disposed at a first structure member and a last structure member of the sequence, the controller assembly and the external electronic device generate a relative movement through the self-stabilizing axes, and the external electronic device is not on a movement track of the controller assembly, the motion sensor generates a control signal to the external electronic device in response to the relative movement.

16. The gaming controller according to claim 15, wherein the external electronic device is a display, and the gaming controller includes a processing module electrically connected to the motion sensor and the display, the display is assembled to the self-stabilizing module or disassembled from the self-stabilizing module, and the display assembled to the self-stabilizing module is electrically connected to the self-stabilizing module, the controller assembly and the processing module, and the processing module generates a frame signal to transfer to the display according to a program, and the processing module generates another frame signal to transfer to the display according to the control signal and the program, and said another frame signal corresponds to the movement posture of the gaming controller relative to the display.

17. The gaming controller according to claim 15, wherein the external electronic device includes a display and a processing module electrically connected to the motion sensor and the display, when the external electronic device is assembled to the self-stabilizing module, the display, the processing module, the self-stabilizing module and the controller assembly are electrically connected, the processing module generates a frame signal to the display according to a program, and the processing module generates another frame signal to transfer to the display according to the control signal and the program, and said another frame signal corresponds to the movement posture of the gaming controller relative to the display.

18. The gaming controller according to claim 15, wherein the controller assembly includes a steering wheel disposed at the first structure member of the sequence.

19. The gaming controller according to claim 18, wherein the self-stabilizing axes of the self-stabilizing units are orthogonal to each other.

20. The gaming controller according to claim 18, wherein the last structural member equipped with the external electronic device is an adjustable fixture.

21. The gaming controller according to claim 18, wherein the last structural member has an electrical connection interface, and the external electronic device is electrically connected to the self-stabilizing module through the electrical connection interface.

22. The gaming controller according to claim 18, wherein the controller assembly further comprises:
at least one control button or at least one control paddle disposed on the steering wheel.

23. The gaming controller according to claim 15, wherein the motion sensor is an optical tracking sensor disposed in the self-stabilizing module to sense a relative rotation angle between different structural members of the self-stabilizing module.

24. The gaming controller according to claim 15, wherein the motion sensor is a gyroscope, disposed in the self-stabilizing module to sense a relative rotation angle between different structural members of the self-stabilizing module.

25. The gaming controller according to claim 15, wherein the external electronic device is assembled at a first connection portion of the self-stabilizing module, and the controller assembly is assembled at a second connection of the self-stabilizing module, the second connection portion is different from the first connection portion, and the first connection portion and the second connection portion generate a relative movement through the at least two self-stabilizing axes.

\* \* \* \* \*